(12) United States Patent
Osotio et al.

(10) Patent No.: US 10,373,385 B2
(45) Date of Patent: Aug. 6, 2019

(54) SUBTRACTIVE RENDERING FOR AUGMENTED AND VIRTUAL REALITY SYSTEMS

(71) Applicant: Microsoft Technology Licensing, LLC, Redmond, WA (US)

(72) Inventors: Neal Osotio, Sammamish, WA (US); Angela Moulden, Ravensdale, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/378,373

(22) Filed: Dec. 14, 2016

(65) Prior Publication Data

US 2018/0165883 A1 Jun. 14, 2018

(51) Int. Cl.
*G06T 19/00* (2011.01)
*G06T 19/20* (2011.01)

(52) U.S. Cl.
CPC ............ *G06T 19/006* (2013.01); *G06T 19/20* (2013.01); *G06T 2219/2004* (2013.01)

(58) Field of Classification Search
CPC .......................... G06T 19/006; G06K 9/00671
See application file for complete search history.

(56) References Cited

U.S. PATENT DOCUMENTS

| 6,031,519 | A | 2/2000 | O'Brien | |
|---|---|---|---|---|
| 8,643,569 | B2 | 2/2014 | Vesely | |
| 2001/0056230 | A1* | 12/2001 | Barak | G06T 19/006 600/407 |
| 2009/0102845 | A1 | 4/2009 | Takemoto et al. | |

(Continued)

FOREIGN PATENT DOCUMENTS

| EP | 2269533 A1 | 1/2011 |
|---|---|---|
| WO | 2016079470 A1 | 5/2016 |
| WO | 2016079474 A1 | 5/2016 |

OTHER PUBLICATIONS

Bichlmeier, Christoph, et al. "Contextual anatomic mimesis hybrid in-situ visualization method for improving multi-sensory depth perception in medical augmented reality." Mixed and Augmented Reality, 2007. ISMAR 2007. 6th IEEE and ACM International Symposium on. IEEE, 2007.*

(Continued)

*Primary Examiner* — Daniel F Hajnik (74) *Attorney, Agent, or Firm* — Jeffrey L. Ranck; Ranck IP Law (57) ABSTRACT

Representative embodiments allow rendering of negative space in real world objects in a virtual reality or augmented reality system. Negative space is what exists within a real-world object. Positive space is what exists outside of a real-world object. Scans of a real-world object are submitted to a search engine to retrieve a negative space model for the positive space object. The negative space model is optionally adjusted to account for real world parameters of the negative space. Anchor points are identified for the negative space model. A positive space portion of the real-world object is removed and the negative space model is scaled, rotated and rendered on top of the real-world object at the appropriate location. A user can interact with both the real-world object and negative space object through the virtual reality or augmented reality system.

16 Claims, 7 Drawing Sheets

(56) References Cited

U.S. PATENT DOCUMENTS

| | | | |
|---|---|---|---|
| 2013/0335301 | A1 | 12/2013 | Wong et al. |
| 2014/0043433 | A1* | 2/2014 | Scavezze ............... G06T 19/006 348/42 |
| 2014/0049559 | A1 | 2/2014 | Fleck et al. |
| 2014/0210856 | A1* | 7/2014 | Finn ..................... G01C 15/002 345/633 |
| 2014/0354689 | A1 | 12/2014 | Lee et al. |
| 2015/0084989 | A1 | 3/2015 | Laughlin et al. |
| 2015/0277378 | A1 | 10/2015 | Smithwick et al. |
| 2015/0363978 | A1* | 12/2015 | Maimone ........... G02B 27/0172 345/633 |
| 2016/0030131 | A1 | 2/2016 | Yang et al. |
| 2016/0166336 | A1* | 6/2016 | Razzaque .............. A61B 34/20 606/130 |
| 2016/0324580 | A1 | 11/2016 | Esterberg |
| 2016/0364914 | A1* | 12/2016 | Todeschini ............ G06T 19/006 |
| 2017/0018204 | A1* | 1/2017 | Savitsky .............. A61B 8/4254 |

OTHER PUBLICATIONS

Seifert, Sascha, et al. "Semantic annotation of medical images." Proceedings of the SPIE Medical Imaging. 2010.*

Macedo, Márcio Cerqueira de Farias, et al. "High-quality on-patient medical data visualization in a markerless augmented reality environment." (2014).*

BIM One—NPL Video "Metal stud walls in Revit", published Apr. 5, 2014, publicly available for view at: https://www.youtube.com/watch?v=A-OMgXU6e6g; select screenshots included.*

Ma, Meng, et al. "Personalized augmented reality for anatomy education.";Clinical Anatomy;29.4 (2016): 446-453.; Published online on Dec. 8, 2015. (Year: 2015).*

NPL Video Titled "Magic Mirror—Anatomy Learning", published Jun. 5, 2014; available for viewing at: https://www.youtube.com/watch?v=Cab1IoFvZ98; selected screenshots included. (Year: 2014).*

Knight, Will, "A Display That Makes Interactive 3-D Seem Mind-Bogglingly Real", Published on: Dec. 18, 2012 Available at: https://www.technologyreview.com/s/508991/a-display-that-makes-interactive-3-d-seem-mind-bogglingly-real/.

"Virtual holography in architecture", Retrieved on: Jul. 20, 2016 Available at: http://nttl.ru/virtual-holograms-arch/.

"Delivering the first immersive exploration user experience", Published on: Apr. 10, 2016 Available at: http://cdn.zspace.com/archived-files/OverviewBrochure_0119.pdf.

"Microsoft hololens headset integrates digital holograms with real life", Published on: Jan. 22, 2015 Available at: http://www.designboom.com/technology/microsoft-hololens-headset-digital-holograms-1-22-2015/.

Mooij, Jeroen De, "Controlling Holographic Objects", Published on: Sep. 15, 2014 Available at: https://www.behance.net/gallery/19754651/Controlling-Holographic-Objects.

"International Search Report and Written Opinion Issued in PCT Application No. PCT/US2017/065205", dated Feb. 28, 2018, 12 Pages.

Zitova, et al., "Image Registration Methods: A Survey", In Journal of Image and Vision Computing, vol. 21, Issue 11, Oct. 1, 2003, pp. 977-1000.

* cited by examiner

SUBTRACTIVE RENDERING FOR AUGMENTED AND VIRTUAL REALITY SYSTEMS

FIELD

This application relates generally to virtual and augmented reality systems. More specifically, embodiments disclosed herein disclose rendering negative space to allow a user to see inside a real world object.

BACKGROUND

Virtual reality and augmented reality hold promise for applications well beyond user entertainment. Virtual reality (VR) typically refers to computer technologies that use software to generate realistic images, sounds and other sensations that replicate a real environment (or create an imaginary setting), and simulate a user's physical presence in this environment, by enabling the user to interact with this space and any objects depicted therein using specialized display screens or projectors and other devices. Augmented reality (AR) is a live direct or indirect view of a physical, real-world environment whose elements are augmented (or supplemented) by computer-generated sensory input such as sound, video, graphics or GPS data.

Users in a VR or AR environment typically are presented objects which can be manipulated and/or otherwise interacted with to modify the environment.

It is within this context that the present disclosure arises.

DETAILED DESCRIPTION

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

OVERVIEW

Virtual reality allows users to interact with a virtual representation of real world objects while augmented reality overlays additional information on view of the real world. In all these instances, users interact with positive space representations of objects and can manipulate the positive space objects, attach one positive space object to another and so forth.

Positive space objects are objects defined by their external surfaces. Thus, a positive space object is the way an object looks. Negative space objects, on the other hand, are objects defined by internal surfaces of a positive space object. Said another way, negative space objects are the internals of a positive space object of what is underneath the external surfaces of a positive space object. In real world objects, positive and negative space objects tend to be nested. Thus, an engine is a positive space object. If the head covers are removed, it reveals negative space objects such as the cylinders and pistons, the latter of which is itself a positive space object.

The present disclosure includes systems and methods that allow a user to view and interact with negative space objects in real-world objects. Different embodiments can be used in an augmented reality or virtual reality system. In augmented reality systems, a real-world three-dimensional (3D) object is viewed with the augmented reality system. An image or other representation of the object is used to identify negative space models suited to the real-world object. For example, an image of the real-world object can be submitted to a search service and the search service can identify negative and/or positive space objects associated with the real-world object. Negative space objects define a representation of the negative space associated with the real-world object.

Sensors, scans or other measurements of the real-world object can provide data about the negative space of the real-world object. For example, an x-ray image of an engine may reveal the conditions of the cylinders, pistons and/or other negative-space objects. The data can be used to adjust a negative space object to reflect the actual condition of the internal objects. For example, if a scan reveals that a cylinder in an engine has a wear pattern, a crack or other damage, one or more of the parameters of the negative space model of the cylinder can adjusted to include the wear pattern, crack, and so forth. Additionally, or alternatively, the scan data can be used to create a negative space model of the actual negative space of a real-world object.

A negative space model can comprise a plurality of anchor points that define how a negative space model is anchored to a representation of a real-world object. In some embodiments, these anchor points can be intersection points where the real-world object and the negative space model intersect. The plurality of anchor points define scaling, rotation, positioning and other adjustments that are made to the negative space model to correctly orient the negative space model within and in conjunction with the real-world object.

Depending on the relationship between the real-world object and the negative space object, it may be sufficient to superimpose the negative space object on top of the real-world object representation in such a way that the negative space object obscures the real-world object so that it appears that the real-world object has been opened so the internals can be viewed. In other situations, the system first removes positive space aspects of the real-world object representation and then overlays the negative space object so that it appears that the real-world object has been opened so the internals can be viewed.

Once the negative space model is anchored to the real-world representation, the real-world object is rendered with the negative space model. The user point of view is then tracked so that as the user moves, the real-world representation and negative space model can be re-rendered based on the changing point of view.

Because the real-world object has not actually been opened to reveal the negative space inside, if a user tries to place hands inside the negative space, they will encounter the actual real-world object. Thus, interactions with the negative space object are virtual interactions using gestures and other input mechanisms to manipulate the real-world representation with the negative space model. Such gestures can include taking additional positive space objects and placing them inside the negative space and otherwise manipulating the negative space.

DESCRIPTION

Figure 1:
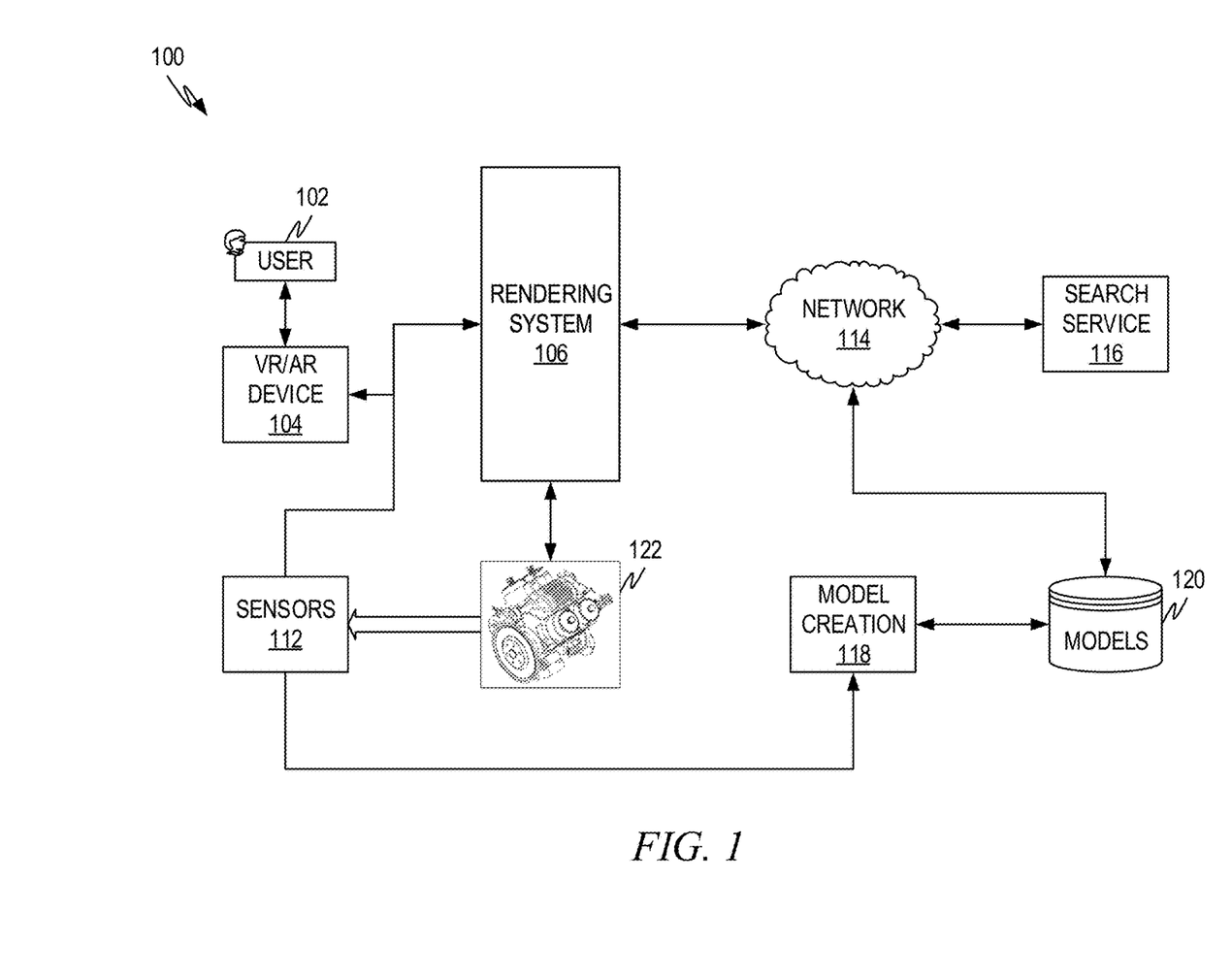
FIG. 1 illustrates an example architecture of a system for rendering negative space in an augmented reality or virtual reality system.

FIG. 1 illustrates an example architecture 100 of a system for rendering negative space in an augmented reality or virtual reality system. A user 102 interacts with augmented and/or virtual reality through an AR or VR device 104. Hereafter, the embodiments will be presented using an AR example and differences for VR embodiments will be separately explained. The AR device 104 utilizes a rendering system 106 to present an augmented reality view to the user 102. In the case of VR, the user is presented a VR world within which to manipulate objects. The rendering system 106 can be part of the AR device 104 or can be a separate system, depending on the embodiment.

The rendering system 106 presents a representation of a real-world object 122. In the AR context, the real-world representation may simply be the object itself, viewed by the user through a lens that allows additional information to be overlaid. In this situation, the real-world representation may be a data structure that describes how the user perceives the real-world object. This data structure can capture the user's point of view, the lighting conditions, the scale that the user sees the object, and other such information that allows the system to identify what the user is seeing so that as information is overlaid on the object, the information lines up appropriately. Additionally, or alternatively, the AR device 104 and/or the rendering system 106 can capture an actual representation of the object such as an image, wireframe, and so forth. The representation and any associated information allows the rendering system 106 to identify what the user perceives through the AR device 104.

The rendering system 106 is connected to a search service 116, usually over a network 114. The search service 116 can be utilized to locate models as described herein. Search services can typically retrieve information by identifier, such as a word, key phrase, or other identifier, or can retrieve images by similarity. For example, both Google® and Bing® search engines allow users to submit an image and the search engines will return similar images. This technology can also be used to locate images, representations and/or models associated with real-world objects.

Models are stored in one or more data stores, such as the model store 120. The model store 120 can be a database or other type of data store that stores 3D and/or 2D models used herein. Models can be two or three dimensional, depending on the exact circumstance and situation. However, in most instances, the models will be three-dimensional and three-dimensional model examples are primarily used in the description.

Models can be created in various ways in different embodiments. For example, models can be hand created by individuals, either with the help of computerized tools or hand drawn/coded. Many tools exist to allow users to draw three dimensional objects and then convert the three-dimensional drawn object into a 3D model for a virtual reality system. Models can be created using these tools.

Models can also be created by model creation process 118, using sensors 112. Sensors fall into those that image the outside of an object and those that image the inside of an object. The former can be used to create positive space models and the latter can be used to create negative space models. For example, Magnetic Resonance Imaging (MRI), Computerized Axial Tomography (CT) scan, ultrasound, and/or other data can be converted into a 3D negative space model. As a representative example, sequentially mounted MRI slices can be used to begin construction of the negative space model. Segmentation can then be used to select the portions of the MRI slices that will be used to construct the model. Such MRI data can be augmented by other sensor data such as ultrasound data and other data gathered by other sensors. For materials that do not lend themselves to MRI and/or ultrasound scanning, other sensor/scanning processes can be used such as x-ray, thermal, and other sensors used to perceive what is happening below the surface of an object.

For positive space models, optical and other such scanning and imaging sensors can be used. Methods exist that allow a 3D model to be constructed from images from different angles of an object. These methods can be used to create 3D positive space models from images and other sensor data. 3D scanners also exist that can scan an object and create a 3D positive space model.

The model creation process 118 takes information from sensors 112 and creates the positive and/or negative space models as previously described.

In operation, a user 102 will view an object 122 with the AR device 104. In some embodiments, an image or other representation of the object 122 is used to retrieve a model of the object 122 from model store 120. The model of the object can be used in rendering the object 122, in some embodiments. Additionally, or alternatively, the model can be used to retrieve negative space models as described below. The rendering system 106 will render the object 122 if necessary or will simply allow the object to be seen through the lens/screen of the AR device 104.

A user will indicate through gesture or other command that the user wishes to see inside the object. The gesture can indicate the portion of the object that the user wishes to remove so the inside can be seen. For example, a doctor may indicate that she wishes to see inside the user's chest area or a user may indicate that they wish to see inside the upper portion of a radiator of a car. Thus, the gesture allows the rendering system 106 to identify the positive space portion that should be removed. Furthermore, as discussed in greater detail below, the rendering system 106 can identify and reconstruct the negative space that should be rendered as the rendering system 106 removes the positive space portion.

The rendering system 106 sends information to the search service 116 and retrieves the negative space portion to be rendered. Once the negative space portion is received, the rendering system 106 removes the positive space portion, if needed, and renders the negative space portion. The rendered object is presented to the user 102 through the AR device 104.

An embodiment using a VR system instead of an AR system would work in much the same way except the VR system would render the object 122 in the VR world instead of allowing the object 122 to be displayed or viewed through the screen, lens, etc. of the AR system. This may entail also retrieving a model of the object 122 itself, such as through the search service 116.

Figure 2:
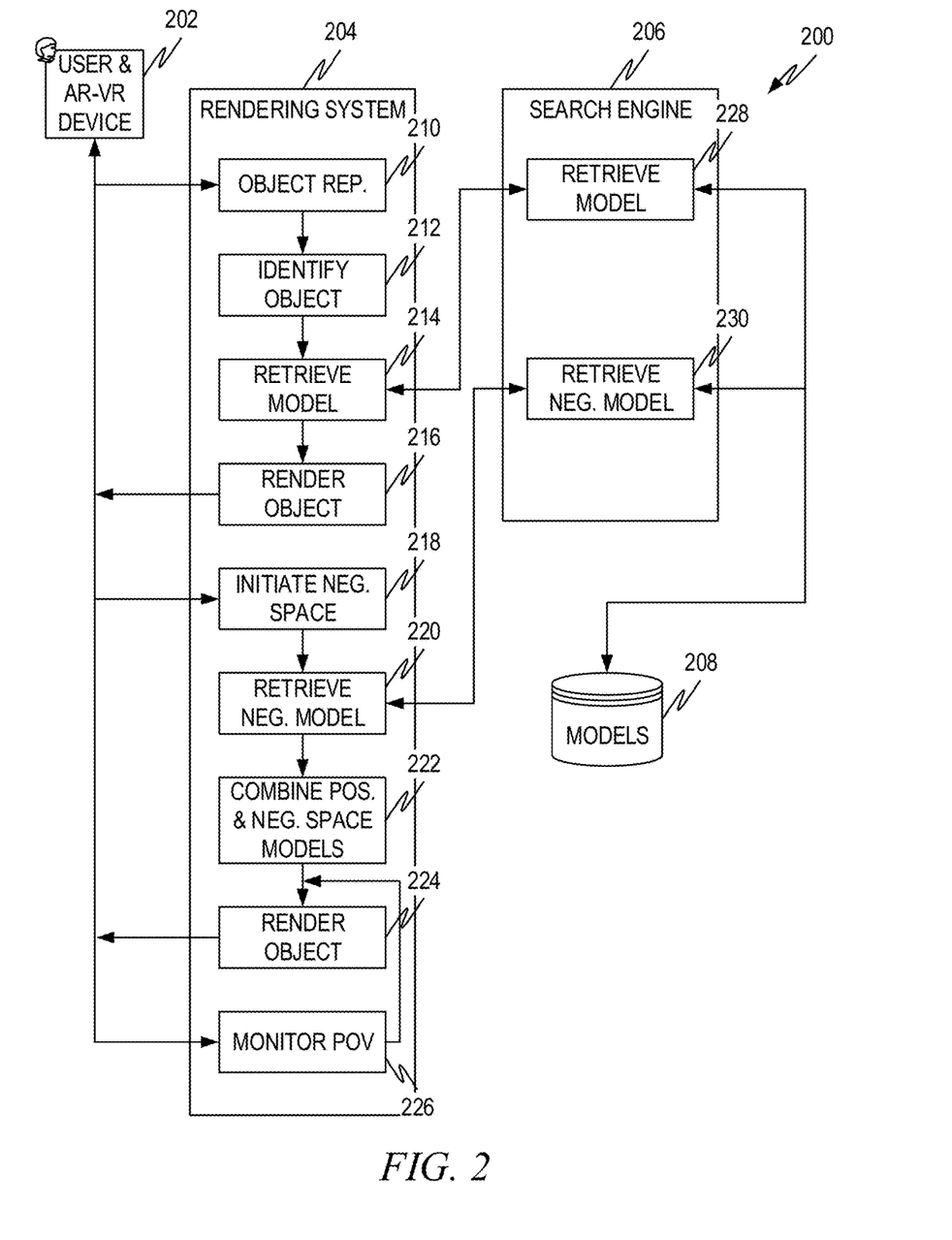
FIG. 2 illustrates an example interaction diagram between a rendering system and a search service.

FIG. 2 illustrates an example interaction diagram 200 between a rendering system 204 and a search service 206. This diagram describes in greater detail how the architecture in FIG. 1 works. In the following description, the operations may be performed in different orders in different embodiments. Additionally, some operations are optional in various embodiments and thus an embodiment may comprise fewer than all the operations illustrated in various combinations.

The user 202 views the object through the VR/AR device. In operation 210 the rendering system receives an object representation from the user/AR device 202. The representation describes or illustrates the object to the rendering system. For example, a representation can be a 2D or 3D image of the object, such as might be taken by sensors either in the AR/VR system or from another source (camera, etc.). A representation can also describe the object in an AR system. For example, in an AR system an image of the object is not presented to the user. Instead, the user directly views the object through the lens/screen of the AR system. In this case a representation can comprise anything that describes the object, such as an outline of the object, the location, scope, etc. on the lens/screen and so forth.

The representation of the object received in operation 210 can come from the VR/AR system 202 or can be captured by other sensors such as cameras, optical scanners, 3D printers, 3D scanners, CAT scans, MRIs, ultrasound, x-ray and so forth. In addition, models can also be used as representations. Models can be created as previously described using drawing and/or modeling programs. The VR/AR system 202 can work in conjunction with these sources to produce the representation.

Operation 212 identifies the object, or identifies information about the object that can be used to retrieve information needed to render the object (operation 216). In some embodiments, this is the representation, such as an image. In other embodiments, this is a description, an identifier, or other information that identifies the object. In some embodiments, this operation is optional, as no identification other than the representation is used for operations such as retrieving models from model store 208.

In some embodiments, identifier(s) from operation 212 and/or the representation is used to retrieve a model of the object from the model store 208. In these embodiments, operation 214 sends information to the search service 206 and the search service 206 retrieves a model of the object from model store 208 (i.e., as illustrated in operation 228). Search services can take identifiers such as key words, a description, an image and so forth and use the identifier to retrieve a model from the model store 208. This functionality is known and implemented in many if not most search services and need not be repeated here.

The retrieved model of the object can be used, for example, in rendering the object (operation 216) and for other purposes described below. In AR systems, a model may not be needed to render an object as the object tends to be directly viewed by the user as previously discussed. In VR systems, the retrieved model can be used to render the object in the virtual world of the VR system.

The result of the prior operations is that the user views the object via the VR/AR device 202. In addition to the object, the system can project additional information about the object to the user. When the user desires to explore negative space of the object, the user uses a gesture or other command to indicate that the rendering system 204 should render negative space of some part of the object. This gesture/command is received by the rendering system (operation 218) and the system retrieves the appropriate negative space model as indicated by operation 220.

Negative space models can be located using the search service 206. The search service can match the real-world positive space object to a corresponding negative space model. For example, the identifier, image, etc. of operation 212 can be used to retrieve a negative space model (operation 230). In this case the search service 206 would use the image, identifier, etc. to retrieve negative space models instead of similar positive space objects, models, images, etc. Additionally, or alternatively, the search service 206 can utilize a positive space model (i.e., retrieved by operation 214/228) to retrieve an appropriate negative space model. The search service 206 can take any of this input and produce the appropriate negative space model using the known search methods.

Negative space models can be created as previously described from modeling software, from sensor data, and/or combinations thereof. The negative space models are stored in the model store 208 in a way that allows them to be retrieved using images, identifiers, models, and so forth of the positive space object.

When the negative space model is received in operation 220, the negative space model can be modified and/or combined with sensor data to match the model to the actual negative space of the object. This can include adjusting one or more parameters of the negative space model. The parameters can comprise location of various objects/features of the negative space model, size of the various objects/features of the negative space model, condition of the various objects/features of the negative space model, the actual objects/features that are part of the negative space model and so forth. These parameters can be identified by sensor data and/or scanning data that can sense the internal negative space of the object. As previously discussed, ultrasound, MRI, CAT scan, infrared, x-ray and so forth can be used to sense the negative space of an object, and identify one or more of the listed parameters.

As examples of parameter sensing, sensor data can identify such things as the location, size, condition of various internal organs, spaces and so forth of a human body. The same and/or similar technology can be used to sense the location, condition and so forth of the internals of non-human objects. As discussed above, the pistons and piston cylinder of an engine can be modified to account for wear, damage and other conditions that are sensed by sensors, scanners, and so forth. Negative space models can comprise positive space objects as well as voids/spaces. The negative space model can be adjusted by modifying the location, size, existence, condition, and so forth of the positive space objects and voids that comprise the negative space objects.

Once the rendering system 204 retrieves the negative space model and (optionally) modifies the negative space model to account for the actual condition, location, size, existence and so forth of the various aspects of the negative space model to reflect the parameters of the negative space of the object, the negative space model is combined with the positive space object (operation 222) and rendered (operation 224). The combination of a negative space model and positive space object is discussed in greater detail below. As a summary, the negative space model is rotated, scaled, and so forth as needed and anchored to the positive space model in the appropriate location, orientation and scale.

The combination of positive space object and negative space model of operation 222 depends on the VR/AR system being used. For example, if the system is a VR system that utilizes a 3D model of the object rendered in a VR world, then operation 222 will combine the negative space model and the positive space object model. This can comprise removing the portions of the positive space object model that would otherwise hide the negative space model and the negative space model is anchored to the appropriate location at the correct orientation and scale and the positive space and negative space models are rendered as a single object. Known graphic rendering algorithms can be used to render the combined positive and negative space models.

If the system is an AR system that allows direct view of the object through the lens/screen of the AR system, then one of two approaches can be taken. The first approach is to replace the real-world object with a positive space model and proceed as if the system were a VR system (described above). In this option, the model would be placed so that it covers the real-world object and the real-world object would be hidden behind the rendered combined negative and positive space models. Alternatively, the negative space object can be combined with the real-world object so that the negative space model is rendered overlaid on the actual positive space object. This is discussed in greater detail in conjunction with FIGS. 3-4 below.

Once the object is rendered with the negative space model (operation 224), the system tracks the user point of view (POV) (operation 226), the room lighting, and other information to keep the object and negative space model rendered from the proper point of view and in the proper lighting so that the negative space model stays in an appropriate relationship with the object.

In the case of a VR system, the entire model (positive space object and negative space model) is virtual so the VR system can allow the user to interact directly with the positive and negative space models. In the case of an AR system, the actual positive space object exists and so if the user attempts to manipulate the negative space directly, the real-positive space may interfere. For example, if an engine is rendered without the heads and a negative space model of the pistons, cylinders and so forth rendered in its place, if the user attempts to touch one of the pistons of the negative space, the heads, which still exist even if they have been removed in the rendering, will block the user's hands. Thus, in an AR system, interactions with the negative space model are generally performed via gestures and so forth that do not actually touch the virtual model in a real sense. Virtual touches and/or other interactions are accommodated through gestures, virtual hands, cursors, instruments (i.e., tools, surgical instruments, etc.) and so forth.

As the user interacts with the positive space and negative space models, the state of the models is updated to reflect the manipulation/interaction with the user. The updated models can also be saved and/or stored in a store (model store 208 or other data store).

Figure 3:
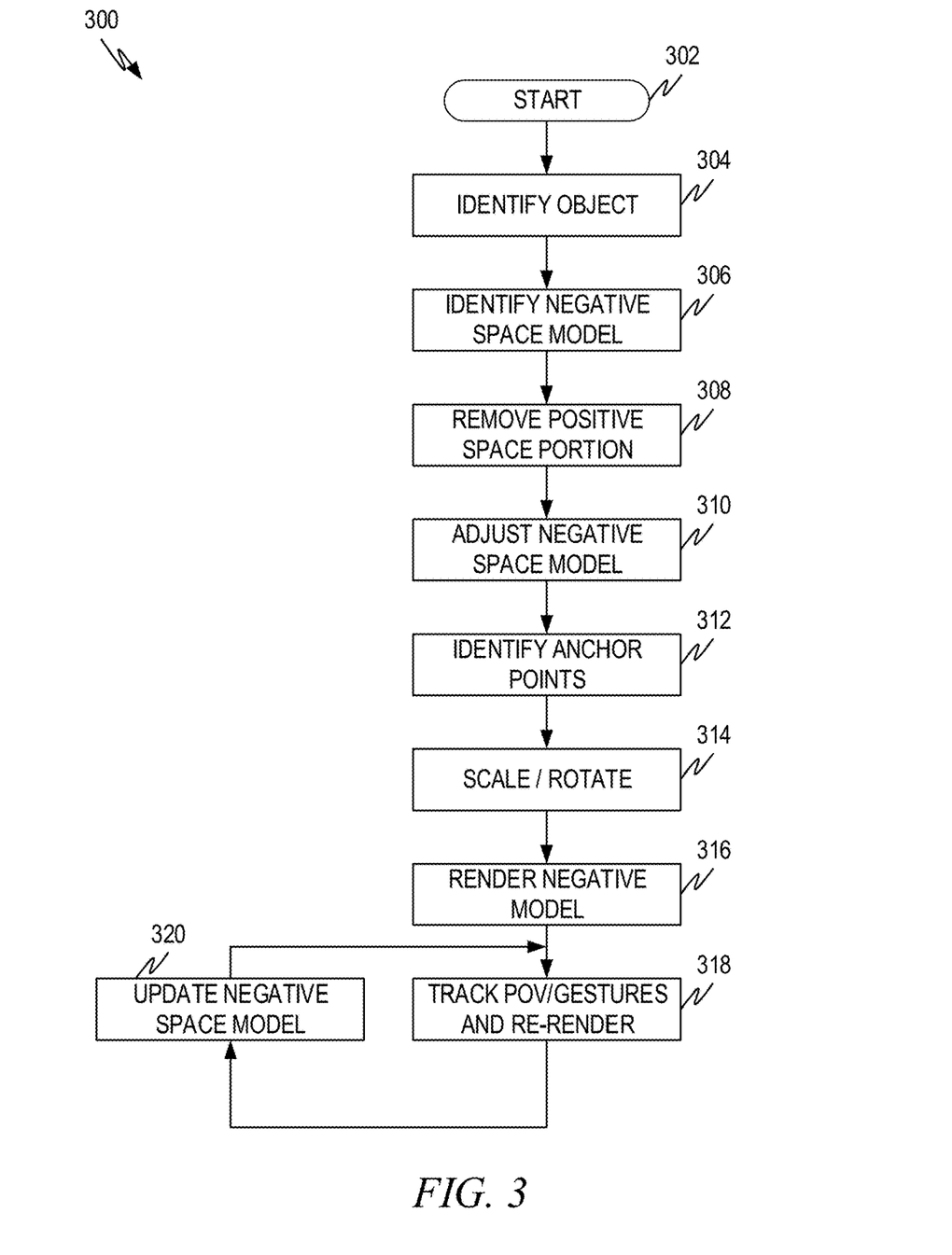
FIG. 3 illustrates an example flow diagram for rendering negative space.

FIG. 3 illustrates an example flow diagram 300 for rendering negative space. The flow diagram starts at operation 302 and execution proceeds to operation 304 where the object is identified. As previously discussed, this can comprise accessing an image or other description/identifier of the object that the search service can use to retrieve an associated appropriate negative space model. Additionally, or alternatively, operation 304 can identify which portion of the object the user desires to see inside.

A single object may have one or more negative space models associated therewith. For example, if the object is a human body, there can be negative space models for the various parts and areas of the body. If the object is a vehicle, there are many parts/subassemblies inside of the vehicle and each part/subassembly may, in turn, have negative space models associated therewith. Thus, operation 304 can identify which portion of the positive space object the user desires to see inside, i.e., as indicated by the gesture/command of the user. Furthermore, the orientation of the object may dictate what portion of the object the user wishes to see inside.

Once the rendering system has identified the object and/or which portion of the object the user desires to see inside, the appropriate negative space model is identified and/or retrieved as illustrated in operation 306. Thus, the system can send to the search service an indicator of the object (image, identifier, etc.) as well as an indication of the orientation, portion selected, and so forth to facilitate retrieval of the proper negative space model. As noted above, the object image, description, identifier, orientation, etc. can be used to retrieve associated negative space model(s), such as from the search service previously discussed.

Operation 308 removes the portion of the positive space object that will interfere with the rendering of the negative space model during rendering. As discussed above, in some instances, there is no need to remove any aspect of the positive space object and the negative space model can be overlaid on the positive space object. This approach can be used whenever rendering the negative space model will appropriately obscure the portions of the positive space object that would otherwise hide the negative space model. Stated another way, the portions of the positive space object will not obscure the rendered negative space model. Whether the portions of the positive space object will obscure the rendered negative space model can be determined by placing the negative space model at the anchor points (see below) and using vector geometry to determine whether positive space object features would obscure the negative space model for an observer at the POV of the user.

If portions of the positive space object will obscure the rendered negative space model, the portions of the object that would obscure the negative space model can be removed. Removing portions of the positive space object is accomplished differently in a VR system and an AR system. In the VR system, the positive space model of the object is modified to remove the desired portions of the object. Since the positive space model resides entirely in a virtual world, there is no physical aspect of the object that must be obscured or otherwise removed. The model can be adjusted by using vector geometry from the POV of the user to identify which portions of the positive space object model will obscure the negative space model. Using a common example in the disclosure, the heads, valve covers and other parts can be removed from a positive space model of an engine so the negative space model showing the pistons and cylinders can be rendered without interference.

In an AR system, the object is directly visible through the screen/lens of the AR system. Thus, removing a portion of the object is performed by rendering something over the portion of the object to be removed in such a way that the portion is obscured. One way to do this is to identify what is on the "other" side of the object and to render the scene on the other side on top of the portion of the object. For example, if an engine is sitting on engine stand and the valve covers and heads are to be removed, the rendering system can receive a view of what would otherwise be visible to the user in the environment if those parts were removed. The view is then rendered on top of the portion of the object, which will cause the object to "disappear" from the object since the AR system will present what the user would see if the portion of the object was not there.

The view of what is on the other side of the object can be obtained in several ways. If there are sensors in the environment, the sensors can identify what the environment looks like and the data can then be used to construct a model of the environment. Additionally, or alternatively, the AR system can be used to capture a view of the environment and the model be constructed based on what the AR system sees. In yet another example, what the AR system sees from the current POV of the user can be used to extrapolate what is behind the portion to be removed. Graphic extrapolation method typically clone what is visible and extend it to what would be "behind" the portion. In other words, the area surrounding the portion to be removed is replicated and rendered on top of the portion to be removed. During the replication process a blur and/or other filter can be applied to randomize color and texture of the replicated portion so the user's eye will not discern the replication.

Operation 310 adjusts one or more parameters in the negative space model to make the negative space more representative of the actual negative space of the object. As discussed above, this may entail adjusting one or more of location, size, orientation, existence condition, and so forth of the negative space model aspects. Thus, if the negative space model contains something that does not exist in the negative space of the object, the non-existent thing can be removed. Similar adjustments can be made for location, size, orientation, condition and so forth. The parameters to be adjusted are identified through scans and sensor data that yield information about the negative space of the object as previously described. In some embodiments, operation 310 is not performed.

Operation 312 identifies anchor points on the negative space model and on the object in order to know how to orient and scale the negative space model for rendering. the anchor points how to align the negative space model with the object. In 3D space, a plurality of anchor points is used to determine how to anchor the model to the object. Three points define a plane and thus often three or more anchor points are used. However, fewer anchor points can be used when there is no ambiguity on the orientation and scaling of the negative space model relative to the object.

The negative space models that are associated with an object can comprise one or more anchor points that define the relationship between the object and the negative space model. These anchor points can be encoded into the negative space model or can be stored as separate metadata associated with the negative space model. Anchor points can be created when the model is created. If the negative space model is crated via scan and/or sensor data, the sensor data illustrates how the negative space model is related to the object. In this situation, the model creation process, such as that described above, can identify features in the object and negative space model where anchor points can be placed. Features that make good candidates for anchor points include features that are easily identifiable (i.e., in the model, object, sensor data, etc.), features that define natural points (i.e., corners, intersection of features, etc.), features that are unambiguous/unique, how well the feature ties into the positive space object (i.e., is the corresponding anchor point on the object easily identifiable, a natural point, unambiguous, etc.), and so forth. When the negative space model is created, edge detection and/or feature detection methods can be used to identify anchor points. When multiple anchor points are available, the anchor points can be ranked based on criteria such as how easy they are to identify, distance that separates a potential anchor point from other anchor points, and so forth as described. The top N points can then be selected. If multiple criteria are used, the criteria can be combined into a combined score, such as by using a weighted sum. The anchor points can then be sorted based on the score and the top N anchor points selected.

Once the anchor points on the negative space model and corresponding anchor points on the object are identified, the system can scale, rotate, or perform other transformation on the negative space model so that the anchor points on the negative space model and corresponding anchor points on the object align. This process is illustrated in operation 314. Rotation, scaling and so forth are standard operations that can utilize known methods to align the anchor points.

Operation 316 renders the negative space model in the appropriate location and at the appropriate orientation and scale. For the VR device, this rendering takes place in the virtual world using the methods used by the VR device to render objects. For the AR device, the negative space model is rendered on the object as viewed through the screen/lens of the device so that as the user views the object, the negative space model is superimposed on the object.

Operation 318 tracks the user POV, user gestures, user commands, user location and so forth and re-renders the negative space model as the user moves around, changes their POV, manipulates the object/negative space model and/or the object, and so forth. These algorithms are part of the AR/VR device and rendering system and no special accommodation need be made except to render the negative space model and/or object to maintain alignment of the anchor points. In the case of the AR device, the rendering must also ensure that any parts that have been removed (i.e., through rendering a background on them to 'erase' them from user view) stay removed by re-rendering the background that the user would see if the portion of the object were removed from the object.

Operation 320 can update the negative space model and/or the object as the user moves POV, manipulates the object/negative space model and so forth.

Figure 4:
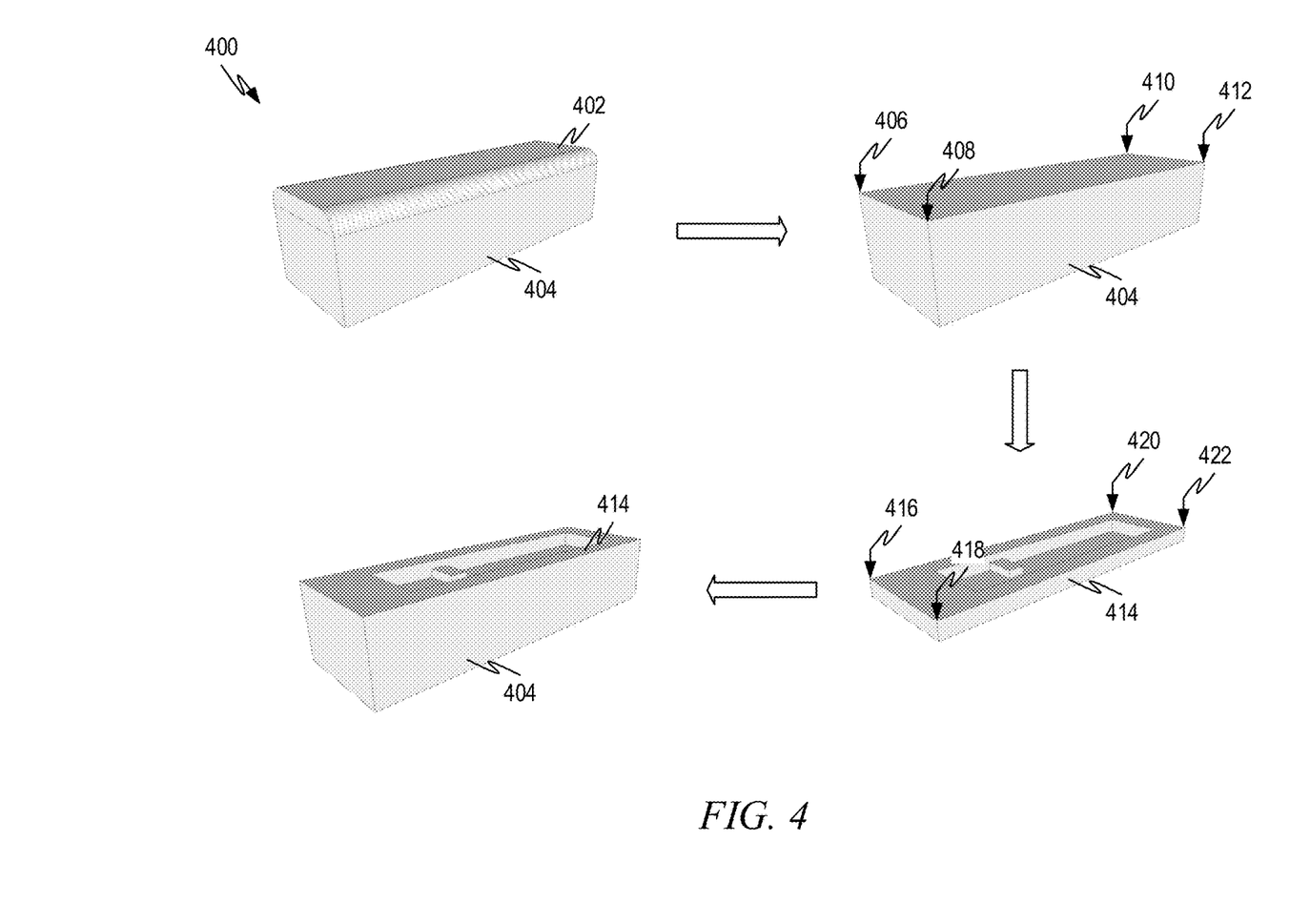
FIG. 4 illustrates an example of rendering negative space.

FIG. 4 illustrates an example of rendering negative space. The sequence 400 shows what an object might look like if the rendering system rendered the object and/or negative space model in a step by step process.

The object of FIG. 4 comprises a top 402 and a lower portion 404. In this example, the top 402 will be removed so the user can see "inside" the box. As previously described, the system renders/allows direct view of the object. The user indicates the top 402 should be removed to see the negative space inside. The rendering system retrieves the negative space model 414.

The top 402 is removed from the object as described above and as illustrated in the figure. Anchor points 406, 408, 410 and 412 are identified on the lower portion 404. Anchor points 416, 418, 420 and 422 are also identified on the negative space model 414 as described above.

The respective anchor points are aligned and the negative space model 414 is rendered on the lower portion 404 as illustrated.

Figure 5:
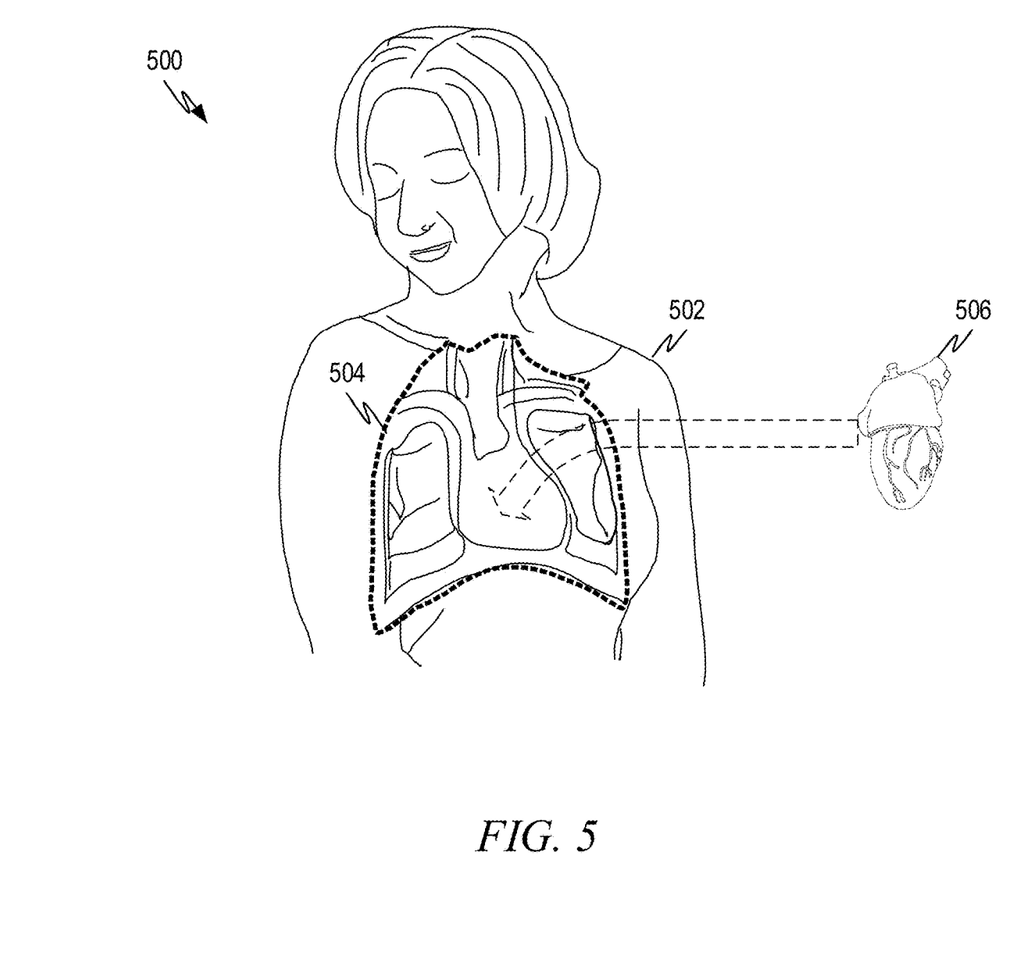
FIG. 5 illustrates another example of rendering negative space.

FIG. 5 illustrates another example of rendering negative space. This figure represents a healthcare scenario where a cardiologist is working with a patient 502 for a heart transplant. Using an AR device, the patient 502 would be visible directly through the screen/lens of the AR device by the cardiologist.

The cardiologist can indicate through a gesture, command, etc. that the cardiologist wishes to view inside the patient's 502 chest cavity (i.e. the negative space). The rendering system knows the patient 502 that the cardiologist is working with either through facial recognition, through the cardiologist entering the patient's name, or through another mechanism. Scan and other sensor data can be used to create a model of the inside of the patient's chest cavity as previously described, either by creating a model using the scan/sensor data or by using the scan/sensor data to modify a more general negative space model to create the modal unique to the patient 502. Thus, there is a negative space model that is tailored to the patient 502.

The rendering system retrieves the appropriate negative space model, aligns the anchor points and renders the negative space model 504 at the appropriate location, giving the cardiologist the ability to see inside the patient's chest cavity. Because the model has been tailored to the patient 502, the cardiologist can see the volume which the transplanted heart will need to fit into. She can also see the surrounding organs, their placement, condition, size and so forth. She can rotate, zoom and otherwise explore the negative space model to assess the situation she will be facing in the transplant. Furthermore, the cardiologist can 'remove' the patient's heart from the negative space model to identify the volume, surrounding tissues and so forth where the transplanted heart will be located.

Through the AR device, the cardiologist can ask the system to retrieve a positive space model of a heart 506. Through gestures, commands (voice or other), and so forth the cardiologist can place the heart model 506 into the negative space model 504. As the heart model 506 is placed into the negative space model, the cardiologist can rotate, move and otherwise manipulate the heart in the negative space model. Through a gesture, command, etc. the cardiologist can also connect the veins, arteries, and so forth to see how the hear looks in place and whether there will be any unforeseen challenges with the transplant.

The negative space model 504 and positive space model 506 can be retrieved through the search service as previously described.

Figure 6:
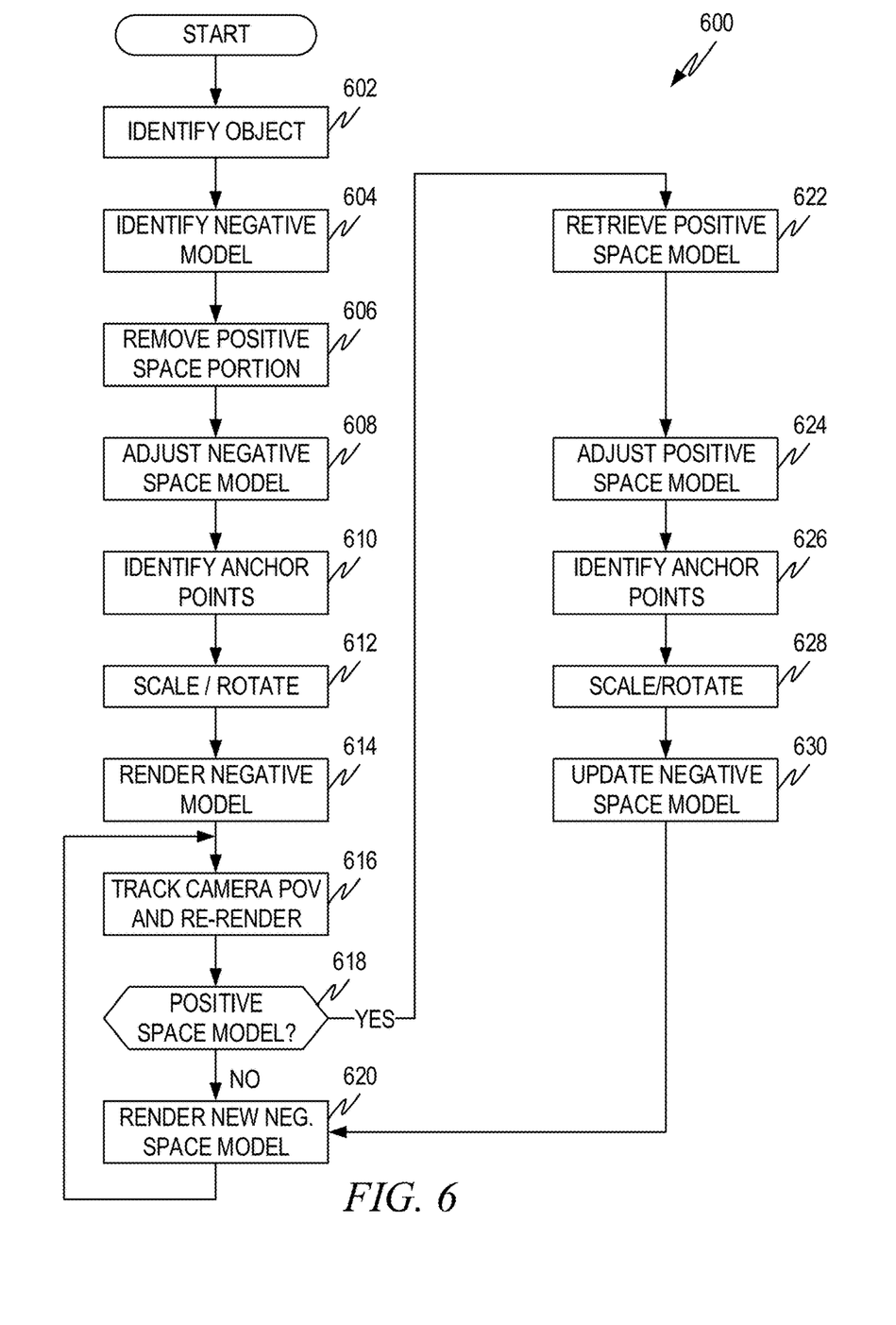
FIG. 6 illustrates an example flow diagram for placing positive space objects into negative space model.

FIG. 6 illustrates an example flow diagram 600 for placing positive space objects into negative space model. This would work, for example, in the scenario described in FIG. 5 where a positive space model (heart) is placed in the negative space model (chest cavity). Operations 602 through 616 work the same as the corresponding operations in FIG. 3 work and their functions and methods need not be repeated here.

When operation 618 is reached, the negative space model that corresponds to the object has been identified, retrieved, scaled, rotated, and anchored at the proper location in the object. Operation 618 determines whether the user would like to insert to insert a positive space model into the negative space model. If so, the "YES" branch is taken out of operation 618 to operation 622.

Operation 622 identifies and retrieves the appropriate positive space model, such as through the search service previously described. The positive space model may be identified by the user, such as with a gesture, command, etc. that indicates a positive space model should be retrieved. The user can similarly indicate which positive space model should be retrieved. Additionally, or alternatively, the rendering system can identify a corresponding model by evaluating the object and/or negative space model. Thus, if the object is an engine of a particular type and the negative space is of the crankshaft area, the rendering system could request a positive space model of a crankshaft of the type that fits into the engine.

Operation 624 adjusts one or more parameters of the positive space model to account for existence, condition, size, shape, etc. as discussed above in conjunction with modifying negative space models. The parameters can be adjusted based on sensor and/or scan data as previously described.

Operation 626 identifies anchor points on the positive space model and corresponding anchor points on the negative space model in a manner similar to that previously described. Operation 628 scales, rotates and otherwise changes the size, orientation and so forth of the positive space model so that the anchor points on the positive space model align with the anchor points in the negative space model.

Operation 630 updates the negative space model for inclusion of the positive space model and execution proceeds to operation 620 where the negative space model, object and positive space model are re-rendered to include the positive space model.

Example Machine Architecture and Machine-Readable Medium

Figure 7:
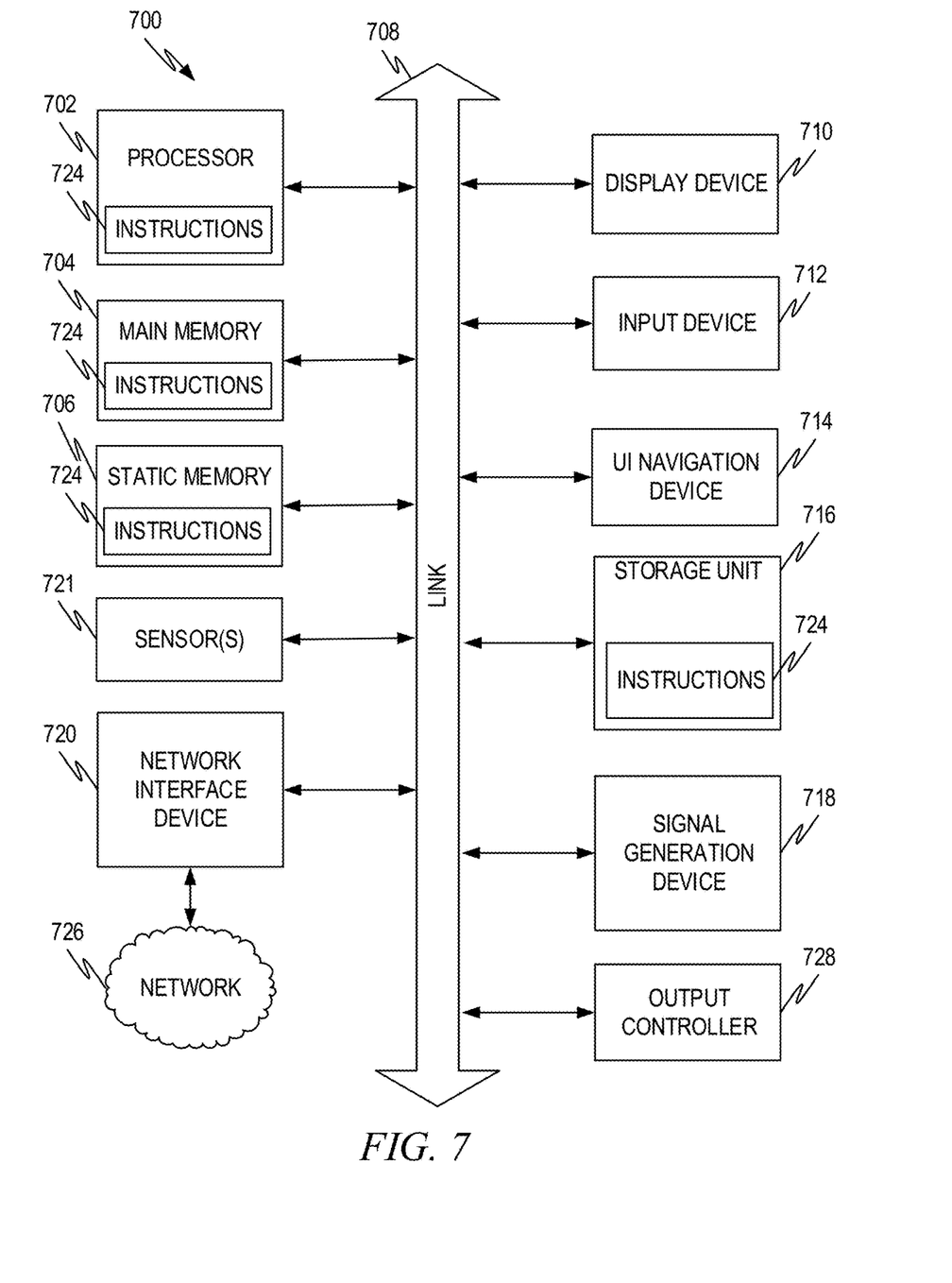
FIG. 7 illustrates a representative machine architecture suitable for implementing the systems and so forth or for executing the methods disclosed herein.

FIG. 7 illustrates a representative machine architecture suitable for implementing the systems and so forth or for executing the methods disclosed herein. The machine of FIG. 7 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 7 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 700 includes at least one processor 702 (e.g., a central processing unit (CPU), a graphics processing unit (GPU), advanced processing unit (APU), or combinations thereof), one or more memories such as a main memory 704, a static memory 706, or other types of memory, which communicate with each other via link 708. Link 708 may be a bus or other type of connection channel. The machine 700 may include further optional aspects such as a graphics display unit 710 comprising any type of display. The machine 700 may also include other optional aspects such as an alphanumeric input device 712 (e.g., a keyboard, touch screen, and so forth), a user interface (UI) navigation device 714 (e.g., a mouse, trackball, touch device, and so forth), a storage unit 716 (e.g., disk drive or other storage device(s)), a signal generation device 718 (e.g., a speaker), sensor(s) 721 (e.g., global positioning sensor, accelerometer(s), microphone(s), camera(s), and so forth), output controller 728 (e.g., wired or wireless connection to connect and/or communicate with one or more other devices such as a universal serial bus (USB), near field communication (NFC), infrared (IR), serial/parallel bus, etc.), and a network interface device 720 (e.g., wired and/or wireless) to connect to and/or communicate over one or more networks 726.

Executable Instructions and Machine-Readable Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-readable medium," "computer-readable medium" and "device-readable medium" mean the same thing and may be used interchangeably in this disclosure. The terms include a single medium or multiple media (e.g., a centralized or distributed database, and/or associated caches and servers) that store the one or more instructions or data structures. The terms shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The terms shall accordingly be taken to include, but not be limited to, solid-state memories, and optical and magnetic media. Specific examples of machine-readable media, computer-readable media and/or device-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The terms machine-readable media, computer-readable media, and device-readable media specifically exclude non-statutory signals per se, which are covered under the term "signal medium" discussed below.

Signal Medium

The term "signal medium" shall be taken to include any form of modulated data signal and signals per se. The term "modulated data signal" means a signal that has one or more of its characteristics set or changed in such a matter as to encode information in the signal.

EXAMPLE EMBODIMENTS

Example 1

A method comprising:
receiving a representation of a real-world object;
retrieving, based on the representation, a negative space model for the real-world object;
identifying a plurality of anchor points on the negative space model and on the representation of the real-world object;
blanking out a portion of the representation of the real-world object;
aligning the plurality of anchor points on the negative space model and on the representation and overlaying the negative space model onto the representation; and
rendering the negative space model and the representation.

Example 2

The method of example 1, further comprising:
submitting the representation to a search service; and
receiving the negative space model from the search service.

Example 3

The method of example 1, further comprising modifying a parameter of the negative space model to match the parameter to real-world negative space of the real-world object.

Example 4

The method of example 1, further comprising:
retrieving a positive space model;
identifying second anchor points in the positive space model and in the negative space model; and
rendering the positive space model within the negative space model such that the anchor points are aligned.

Example 5

The method of example 1, further comprising scanning the real-world object to make a three-dimensional model of the real-world object.

Example 6

The method of example 1, further comprising:
scaling and rotating the negative space model to align the anchor points.

Example 7

The method of example 1, further comprising:
tracking the point of view of a user via a virtual reality or augmented reality system; and
re-rendering the negative space model and the representation based on the point of view to keep the negative space model aligned with the representation.

Example 8

The method of example 1, 2, 3, 4, 5, 6, or 7 wherein the negative space model is constructed by a scan of the real-world object.

Example 9

A computing system comprising:
a processor and executable instructions accessible on a machine-readable medium that, when executed, cause the system to perform operations comprising:
receiving an image of a real-world object;
retrieving, based on the image, a negative space model for the real-world object;
identifying a plurality of anchor points on the negative space model and on a representation of the real-world object;
blanking out a portion of the representation of the real-world object;
aligning the plurality of anchor points on the negative space model and on the representation and overlaying the negative space model onto the representation and
rendering the negative space model and the representation.

Example 10

The system of example 9, further comprising:
submitting the image to a search service; and
receiving the negative space model from the search service.

Example 11

The system of example 9, or 10, further comprising modifying a parameter of the negative space model to match the parameter to real-world negative space of the real-world object.

Example 12

The system of example 9, or 10, further comprising:
retrieving a positive space model;
identifying second anchor points in the positive space model and in the negative space model; and
rendering the positive space model within the negative space model such that the anchor points are aligned.

Example 13

The system of example 9, or 10, further comprising scanning the real-world object to make a three-dimensional model of the real-world object.

Example 14

The system of example 9, or 10, further comprising:
scaling and rotating the negative space model to align the anchor points.

Example 15

The system of example 9, or 10, further comprising:
tracking the point of view of a user via a virtual reality or augmented reality system; and
re-rendering the negative space model and the representation based on the point of view to keep the negative space model aligned with the representation.

Example 16

The system of example 9, or 10, wherein the negative space model is constructed by a scan of the real-world object.

Example 17

A machine-readable medium having executable instructions encoded thereon, which, when executed by at least one processor of a machine, cause the machine to perform operations comprising:
receiving a representation of a real-world object;
retrieving, based on the representation, a negative space model for the real-world object;
identifying a plurality of anchor points on the negative space model and on a representation of the real-world object;
adjusting the negative space model to include the representation of a real-world aspect associated with negative space in the real-world object;
blanking out a portion of the representation of the real-world object;
aligning the plurality of anchor points on the negative space model and on the representation and overlaying the negative space model onto the representation and
rendering the negative space model and the representation.

Example 18

The machine-readable medium of example 17, further comprising:
retrieving a positive space model;
identifying second anchor points in the positive space model and in the negative space model; and
rendering the positive space model within the negative space model such that the anchor points are aligned.

Example 19

The machine-readable medium of example 17, further comprising:
submitting the image to a search service; and
receiving the negative space model from the search service.

Example 20

The machine-readable medium of example 17, 18, or 19, further comprising:
receiving sensor data related to the real-world object from a plurality of sensors;
tracking the point of view of a user via a virtual reality or augmented reality system; and
re-rendering the negative space model and the representation based on the point of view to keep the negative space model aligned with the representation.

Example 21

A method comprising:
receiving a representation of a real-world object;
retrieving, based on the representation, a negative space model for the real-world object;
identifying a plurality of anchor points on the negative space model and on the representation of the real-world object;
blanking out a portion of the representation of the real-world object;
aligning the plurality of anchor points on the negative space model and on the representation and overlaying the negative space model onto the representation; and
rendering the negative space model and the representation.

Example 22

The method of example 21, further comprising:
submitting the image to a search service; and
receiving the negative space model from the search service.

Example 23

The method of example 21 or 22, further comprising modifying a parameter of the negative space model to match the parameter to real-world negative space of the real-world object.

Example 24

The method of example 21, 22 or 23, further comprising:
retrieving a positive space model;
identifying second anchor points in the positive space model and in the negative space model; and
rendering the positive space model within the negative space model such that the anchor points are aligned.

Example 25

The method of example 24, further comprising:
submitting an indicator to a search engine to retrieve the positive space model.

Example 26

The method of example 12, 22, 23, 24, or 25, further comprising scanning the real-world object to make a three-dimensional model of the real-world object.

Example 27

The method of example 21, 22, 23, 24, 25 or 26, further comprising:
scaling and rotating the negative space model to align the anchor points.

Example 28

The method of example 21, 22, 23, 24, 25, 26 or 27 further comprising:
tracking the point of view of a user via a virtual reality or augmented reality system; and
re-rendering the negative space model and the representation based on the point of view to keep the negative space model aligned with the representation.

Example 29

The method of example 21, 22, 23, 24, 25, 26, 27 or 28, wherein the negative space model is constructed by a scan of the real-world object.

Example 30

The method of example 21, 22, 23, 24, 25, 26, 27, 28, or 29, further comprising:
scaling and rotating the negative space model to align the anchor points.

Example 31

The method of example 21, 22, 23, 24, 25, 26, 27, 28, 29 or 30, wherein the representation is a 3D model of the object and wherein the method further comprises:
receiving an image of the object; and
submitting the image of the object to a search service to retrieve the 3D model of the object.

Example 32

The method of example 21, 22, 23, 24, 25, 26, 27, 28, 29 or 30, wherein the representation comprises an image of the object.

Example 33

The method of example 21, 22, 23, 24, 25, 26, 27, 28, 29, 30, or 32, wherein the representation comprises an identifier or keyword associated with the object.

Example 34

An apparatus comprising means to perform a method as in any preceding example.

Example 35

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:
1. A method comprising:
receiving a representation of a real-world object;
receiving a gesture indicating selection of a portion of the real-world object to be removed to expose inside the real-world object;
submitting information about the real-world object and the portion to a search service;
receiving a negative space virtual reality or augmented reality model for the real-world object from the search service that retrieves the negative space model from a repository of virtual reality or augmented reality models;
identifying a parameter of real-world space of the real-world object, the parameter indicating a condition of at least a portion of the real-world object;
based on the parameter, modifying the negative space model to account for the condition of the real-world object;
identifying a plurality of anchor points on the negative space model and on the representation of the real-world object;
blanking out a portion of the representation of the real-world object;
aligning the plurality of anchor points on the negative space model and on the representation and overlaying the negative space model onto the representation; and
rendering the negative space model and the representation;

retrieving a positive space model;
identifying second anchor points in the positive space model and in the negative space model prior to positioning the positive space model; and
rendering the positive space model within the negative space model such that the anchor points are aligned.

2. The method of claim 1, wherein the parameter further indicates at least one of location, size, and existence of an aspect internal to the real-world object; and
modifying the negative space model to account for at least one of location, size, and existence of the aspect of the real-world object.

3. The method of claim 1, further comprising scanning the real-world object to make a three-dimensional model of the real-world object.

4. The method of claim 1, further comprising:
scaling and rotating the negative space model to align the anchor points.

5. The method of claim 1, further comprising:
tracking a point of view of a user via a virtual reality or augmented reality system; and
re-rendering the negative space model and the representation based on the point of view to keep the negative space model aligned with the representation.

6. The method of claim 1, wherein the negative space model is constructed by a scan of the real-world object.

7. A computing system comprising:
a processor and executable instructions accessible on a machine-readable medium that, when executed, cause the system to perform operations comprising:
receiving an image of a real-world object;
receiving a gesture from a user indicating selection of a portion of the real-world object to be removed to expose inside the real-world object;
retrieving, based on the image and the portion, a negative space virtual reality or augmented reality model for the real-world object from a repository of virtual reality or augmented reality models;
identifying a plurality of anchor points on the negative space model and on a representation of the real-world object prior to positioning the negative space model;
blanking out a portion of the representation of the real-world object;
aligning the plurality of anchor points on the negative space model and on the representation and overlaying the negative space model onto the representation; and
rendering the negative space model and the representation;
retrieving a positive space model;
identifying second anchor points in the positive space model and in the negative space model prior to positioning the positive space model; and
rendering the positive space model within the negative space model such that the second anchor points are aligned.

8. The system of claim 7, further comprising:
submitting the image and information derived from the portion to a search service; and
receiving the negative space model from the search service.

9. The system of claim 7, further comprising:
identifying a parameter of real-world negative space of the real-world object, the parameter comprising one or more of location, size, existence, and condition; and
modifying the negative space model to match the parameter thereby adjusting the negative space model.

10. The system of claim 7, further comprising scanning the real-world object to make a three-dimensional model of the real-world object.

11. The system of claim 7, further comprising:
scaling and rotating the negative space model to align the anchor points.

12. The system of claim 7, further comprising:
tracking a point of view of a user via a virtual reality or augmented reality system; and
re-rendering the negative space model and the representation based on the point of view to keep the negative space model aligned with the representation.

13. The system of claim 7, wherein the negative space model is constructed based on data from a scan of the real-world object.

14. A machine-readable medium having executable instructions encoded thereon, which, when executed by at least one processor of a machine, cause the machine to perform operations comprising:
receiving a representation of a real-world object;
receiving a gesture indicating selection of a portion of the real-world object to be removed in order to expose inside the real-world object;
submitting a query containing information about the real-world object or the portion or both to a search service;
receiving from the search service a general augmented reality negative space model that can be adjusted to represent the exposed negative space for the real-world object;
identifying a parameter of real-world negative space of the real-world object, the parameter indicating condition of an aspect of the real-world object;
modifying the general negative space model to match the parameter thereby creating an adjusted negative space model representative of the exposed negative space for the real-world object;
identifying a plurality of anchor points on the negative space model and on a representation of the real-world object prior to positioning the negative space model;
blanking out a portion of the representation of the real-world object;
aligning the plurality of anchor points on the adjusted negative space model and on the representation and overlaying the negative space model onto the representation; and
rendering the negative space model and the representation;
retrieving a positive space model;
identifying second anchor points in the positive space model and in the negative space model prior to positioning the positive space model; and
rendering the positive space model within the negative space model such that the anchor points are aligned.

15. The machine-readable medium of claim 14, further comprising:
submitting the representation to the search service connected with a model repository comprising a plurality of general negative space models; and
receiving the general negative space model from the search service.

16. The machine-readable medium of claim 14, further comprising:
receiving sensor data related to the real-world object from a plurality of sensors;

tracking a point of view of a user via a virtual reality or augmented reality system; and re-rendering the negative space model and the representation based on the point of view to keep the negative space model aligned with the representation.

\* \* \* \* \*